United States Patent [19]

Grigo et al.

[11] Patent Number: 5,026,758
[45] Date of Patent: Jun. 25, 1991

[54] THERMOPLASTIC MOLDING COMPOUNDS OF POLYCARBONATE, POLYALKYLENE TEREPHTHALATE, SPECIAL BARIUM SULFATE AND OPTIONALLY, ELASTOMERS

[75] Inventors: Ulrich Grigo, Kempen; Jürgen Kirsch; Dieter Wittmann, both of Cologne; Karsten-Josef Idel; Peter Horlacher, both of Krefeld, all of Fed. Rep. of Germany

[73] Assignee: Bayer Aktiengesellschaft, Leverkusen, Fed. Rep. of Germany

[21] Appl. No.: 578,979

[22] Filed: Sep. 4, 1990

[30] Foreign Application Priority Data

Sep. 7, 1989 [DE] Fed. Rep. of Germany ....... 3929672

[51] Int. Cl.$^5$ ................................................ C08K 3/30
[52] U.S. Cl. .................................... 524/423; 524/604; 524/605; 524/611
[58] Field of Search ................. 524/423, 604, 611, 605

[56] References Cited

U.S. PATENT DOCUMENTS

| | | | |
|---|---|---|---|
| 3,368,995 | 2/1968 | Furukawa et al. | 524/423 |
| 3,862,084 | 1/1975 | Zandstra et al. | 524/423 |
| 3,864,428 | 2/1975 | Nakamura et al. | 260/873 |
| 4,264,487 | 4/1981 | Fromuth et al. | 260/40 R |
| 4,482,672 | 11/1984 | Neuray et al. | 525/67 |
| 4,510,196 | 4/1985 | Carter | 524/423 |
| 4,551,497 | 11/1985 | Shinozuka et al. | 524/423 |
| 4,866,123 | 9/1989 | Wittmann et al. | 525/67 |
| 4,894,093 | 1/1990 | Aderhold et al. | 106/461 |

FOREIGN PATENT DOCUMENTS

| | | |
|---|---|---|
| 0110222 | 11/1983 | European Pat. Off. . |
| 122601 | 10/1984 | European Pat. Off. . |
| 335159 | 10/1989 | European Pat. Off. . |
| 362623 | 4/1990 | European Pat. Off. . |
| 3810423 | 10/1989 | Fed. Rep. of Germany . |
| 59-166556 | 9/1984 | Japan . |
| 63-105059 | 10/1988 | Japan . |

*Primary Examiner*—Veronica P. Hoke
*Attorney, Agent, or Firm*—Joseph C. Gil; Aron Preis

[57] ABSTRACT

Thermoplastic molding compositions of polycarbonate, polyalkylene terephthalate, special barium sulfate and, optionally, elastomers are distinguished from known molding compositions of polycarbonate, polyalkylene terephthalate and elastomers by improved heat resistance and toughness.

4 Claims, No Drawings

THERMOPLASTIC MOLDING COMPOUNDS OF POLYCARBONATE, POLYALKYLENE TEREPHTHALATE, SPECIAL BARIUM SULFATE AND OPTIONALLY, ELASTOMERS

This invention relates to thermoplastic molding compounds of polycarbonate, polyalkylene terephthalate, special barium sulfate and, optionally, elastomers and to the use of the thermoplastic molding compounds for the production of moldings, semi-finished products and films.

Thermoplastic molding compounds of polycarbonate, polyalkylene terephthalate and elastomers are known (cf. for example U.S. Pat. No. 3,864,428, EP-A-25 920, 64 648, 110 222, 304 787 and Japanese patent application 59/166 556). The known molding compounds may be processed to moldings of high impact strength. The molding compounds having the composition mentioned have many positive properties. However, there are some technical requirements which they do not satisfy. In particular, they are in need of improvement in regard to toughness at low temperatures and heat resistance.

It has now been found that thermoplastic molding compounds of polycarbonate, polyalkylene terephthalate, barium sulfate having a clearly defined particle size and/or an activated surface and, optionally, an elastomer are distinguished by high heat resistance and good toughness.

Accordingly, the present invention relates to thermoplastic molding compounds of (A) 1 to 99 parts by weight polycarbonate,
(B) 1 to 99 parts by weight polyalkylene terephthalate,
(C1) 0.1 to 50 parts by weight barium sulfate having a chemoreactive surface produced by precipitation of barium ions with sulfate ions in aqueous medium in the presence of additional anions of water-soluble compounds which can be precipitated with barium ions and form sparingly soluble barium compounds, the chemoreactive barium sulfate obtained, optionally after-treated with coupling agents, having particle sizes of <0.1 μm [80 to 5 m²/g (BET)], and/or (C2) 0.1 to 50 parts by weight ultrafine barium sulfate produced by combining separate aqueous solutions respectively containing equivalent quantities of barium ions and sulfate ions and separating the precipitate; to produce precipitated barium sulfate having a primary particle size of <0.1 μm in a closed reactor, the aqueous solutions of the reactants are continuously divided up into large numbers of partial volumes which are combined to form discrete precipitation volumes having an average volume size of <1 μl and the resulting suspension of the precipitate is continuously removed from the reactor, and, optionally, (D) 0.1 to 30 parts by weight of an elastomer, with the proviso that components (A) to (C) or (D) add up to 100 parts by weight.

Preferred thermoplastic molding compounds are those which contain 20 to 80 parts by weight component (A), 80 to 10 parts by weight component (B), 0.1 to 40 parts by weight component (C1) and/or (C2) and, optionally, 1 to 30 parts by weight component (D).

Particularly preferred thermoplastic molding compounds are those containing 40 to 70 parts by weight component A), 20 to 60 parts by weight component (B), 0.1 to 5 parts by weight components (C1) and/or (C2) and, optionally, 5 to 25 parts by weight component (D).

Polycarbonates in the form of homopolycarbonates, copolycarbonates and mixtures thereof may be used as component (A). Diphenols suitable for the synthesis of the polycarbonates are, for example, hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-sulfoxides, bis-(hydroxyphenyl)-sulfones and α,ω-bis-(hydroxyphenyl)diisopropylbenzenes and nucleus-alkylated and nucleushalogenated compounds thereof. These and other suitable aromatic dihydroxy compounds are described, for example, in U.S. Pat. No. 3,028,365 and 2,999,846 and in DE-OSS 2 063 050 and 2 211 957 and in the monograph by H. Schnell entitled "Chemistry and Physics of Polycarbonates", Interscience Publishers, New York, 1964.

Preferred phenols correspond to the following formula:

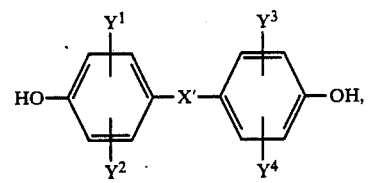

in which
X' is a single bond, —CH$_2$—, —C(CH$_3$)$_2$—, O, S, SO$_2$,

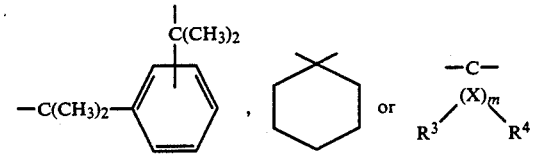

and Y$^1$ to Y$^4$ may be the same or different and represent hydrogen, C$_{1-4}$ alkyl, preferably methyl, or halogen, preferably chlorine or bromine, m is an integer of 4 to 7, preferably 4 or 5, R$^3$ and R$^4$ may be individually selected for each X and, independently of one another, represent hydrogen or C$_{1-12}$ alkyl, preferably methyl, and X represents carbon, with the proviso that at least one ring C atom is simultaneously substituted by C$_{1-12}$ alkyl radicals.

Preferably 1 to 2 ring C atoms and, more preferably, only one ring C atom are simultaneously substituted by alkyl radicals. The ring C atoms in the α-position to the diphenyl-substituted C atom (C-1) are preferably not alkyl-substituted; by contrast, the ring C atoms in the β-position to C-1 are preferably dialkyl-substituted.

The polycarbonates A) also include block copolycarbonates containing 1 to 25% by weight, preferably 1.5 to 15% by weight and more preferably 2 to 10% by weight, based on diphenol residues of the copolycarbonate A), co-condensed residues of diphenols corresponding to the following formula

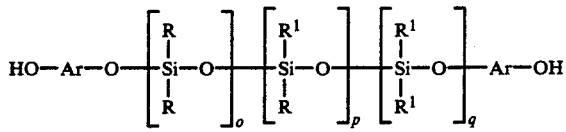

in which

The Ar's may be the same or different and represent arylene radicals,

R and R$^1$ may be the same or different and represent linear alkyl, branched alkyl, alkenyl, halogenated linear alkyl, halogenated branched alkyl, aryl or halogenated aryl and o=0 to 200,
p=0 to 200,
q=0 to 200, with the proviso that o+p+q, i.e. the number of diorganosiloxy units, is from 5 to 200 and preferably from 20 to 160.

Suitable alkyl radicals are those containing 1 to 20 carbon atoms; suitable alkenyl radicals are those containing 2 to 6 carbon atoms while suitable aryl radicals are those containing 6 to 14 carbon atoms. These radicals may be substituted by chlorine, bromine or fluorine. Examples of such radicals are methyl, ethyl, propyl, n-butyl, tert.butyl, vinyl, phenyl, naphthyl, chloromethyl, trifluoropropyl, perfluorobutyl, perfluorooctyl and chlorophenyl.

Preferred radicals R and R$^1$ are the lower alkyl radicals, such as methyl, ethyl, propyl, methyl being particularly preferred.

The diphenols used may be used both individually and in admixture.

The polycarbonates (A) generally have average molecular weights M$_w$ in the range from 10,000 to 200,000 and preferably in the range from 20,000 to 80,000, as determined by light scattering.

Polycarbonates of the type mentioned are described, for example, in U.S. Pat. Nos. 3,821,325; 3,189,662 and 3,419,634 and in DE-OSS 2 411 123, 2 411 363, 3 334 782 and 3 506 472.

The polycarbonates may be produced by known methods, for example by the two-phase interfacial process (cf. for example H. Schnell "Chemistry and Physics of Polycarbonates", Interscience Publishers, New York, 1964).

The polyalkylene terephthalates used as component (B) may be prepared in known manner from terephthalic acid (or reactive derivatives thereof) and aliphatic diols containing 2 to 10 carbon atoms (Kunststoff-Handbuch, Vol. VIII, pages 695 et seq., Carl-Hanser-Verlag, München 1983).

Preferred polyalkylene terephthalates contain at least 90 mol-%, based on the dicarboxylic acid component, of terephthalic acid residues and at least 80 mol-% and preferably at least 90 mol-%, based on the diol component, of ethylene glycol and/or butane-1,4-diol residues.

In addition to terephthalic acid residues, the preferred polyalkylene terephthalates may contain up to 20 mol-% residues of other aromatic or cycloaliphatic C$_{8-14}$ dicarboxylic acids and/or aliphatic C$_{4-12}$ dicarboxylic acids, such as phthalic acid, isophthalic acid, naphthalene-2,6-dicarboxylic acid, 4,4-diphenyl dicarboxylic acid, succinic acid, adipic acid, sebacic acid, cyclohexane diacetic acid.

In addition to ethylene glycol or butane-1,4-diol residues, the preferred polyalkylene terephthalates may contain up to 20 mol-% of other aliphatic C$_{3-21}$ diols or cycloaliphatic C$_{5-21}$ diols, for example residues of propane-1,3-diol, 2-ethylpropane-1,3-diol, neopentyl glycol, pentane-1,5-diol, hexane-1,6-diol,cyclohexane-1,4-dimethanol, 3-methylpentane-2,4-diol, 2-methylpentane-2,4-diol, 2,2,4-trimethylpentane-1,3-diol and -1,6-diol, 2-ethylhexane-1,3-diol, 2,2-diethyl propane-1,3-diol, hexane-2,5-diol, 1,4-di-($\beta$-hydroxyethoxy)-benzene, 2,2-bis-(4-hydroxycyclo-hexyl)-propane, 2,4-dihydroxy-1,1,3,3-tetramethyl cyclo-butane, 2,2,-bis-(3-$\beta$-hydroxyethoxyphenyl)-propane and 2,2-bis-(4-hydroxypropoxyphenyl)-propane (see DE-OSS 24 07 674, 24 07 776, 27 15 932).

The polyalkylene terephthalates may be branched by incorporation of relatively small quantities of trihydric or tetrahydric alcohols or tribasic or tetrabasic carboxylic acids of the type described, for example, in DE-OS 19 00 270 and U.S. Pat. No. 3,692,744. Examples of preferred branching agents are trimesic acid, trimellitic acid, trimethylol ethane and propane and pentaerythritol. It is advisable to use no more than 1 mol-% of the branching agent, based on the acid component.

Polyalkylene terephthalates which have been produced solely from terephthalic acid or reactive derivatives thereof (for example dialkyl esters) and ethylene glycol are particularly preferred.

The polyethylene terephthalates preferably used generally have an intrinsic viscosity of 0.4 to 1.5 dl/g and preferably 0.5 to 0.9 dl/g while the polybutylene terephthalates used generally have a intrinsic viscosity of 0.7 to 1.6 dl/g, preferably 0.8 to 1.3 dl/g and more preferably 0.8 to 1.5 dl/g, as measured in phenol/o-dichlorobenzene (1:1 parts by weight) at 25° C.

Component (C1) of the thermoplastic molding compounds according to the invention may consist of barium sulfate having a chemoreactive surface produced by precipitation of barium ions with sulfate ions in aqueous medium in the presence of additional anions of water-soluble compounds which can be precipitated with barium ions and form sparingly soluble barium compounds, the chemoreactive barium sulfate obtained having particle sizes of >0.1 µm and preferably from 0.09 to 0.01 µm [80 to 5 m$^2$/g and preferably 50 to 10 m$^2$/g (BET)] (see DE-OS 3 718 277 and German patent application P 38 10 423.7).

The product obtained where barium sulfate is precipitated in the presence of corresponding concentrations of anions which form sparingly soluble compounds with barium ions contain the foreign ions either homogeneously distributed throughout the crystal or concentrated at the surface.

Depending on the charge density and molecule size of the anions or doping components, defects in the BaSO crystal lattice are occupied or lattice sites are occupied in statistical distribution and the surface charge is shielded by long apolar molecule residues (hydrophobicizing).

Anions of water-soluble organic or inorganic compounds may be used in the process. In some cases, it may even be appropriate to use mixtures of these compounds.

To carry out the process, these additional components are best added to the aqueous solution containing the inorganic sulfate component, such as alkali sulfate. The additional component is used in a quantity of 0.1 to 50% by weight, based on the barium sulfate to be precipitated. The additional component is preferably used in a quantity of 1 to 10% by weight.

Suitable organic water-soluble compounds for the process are compounds from the group consisting of alkyl and aryl sulfonates, alkyl and aryl sulfates and alkyl or aryl phosphoric acid esters, the alkyl or aryl radical optionally being partly substituted by functional groups, or perfluorinated alkyl or aryl sulfonates. The following compounds for example are used in the process according to the invention: sodium dodecyl benzenesulfonate, sodium lauryl sulfate, sodium cetyl sulfate, phosphoric acid monoethyl monobenzyl ester, lithium perfluorooctane sulfonate.

Suitable compounds bearing alkyl or aryl radicals substituted by functional groups are those containing halogen, hydroxyl, amino, imino, mercapto, carboxyl or alkoxycarbonyl groups or a terminal double bond, for example 12-bromo-1-dodecanesulfonic acid, sodium 10-hydroxy-1-decanesulfonate, sodium carrageenan, sodium 10-mercapto-1-cetanesulfonate, sodium 16-cetene(1) sulfate.

In the process for the production of chemoreactive barium sulfate, inorganic compounds from the group consisting of thiosulfate, silicate, fluoride, fluorosilicate, monofluorophosphate or tungstate are used as anions of water-soluble inorganic compounds (other inorganic compounds than sulfates). Suitable compounds are, for example, sodium thiosulfate ($Na_2S_2O_3.5\,H_2O$), sodium metasilicate ($Na_2SiO_3$), sodium fluoride (NaF), lithium hexafluorosilicate ($Li_2(SiF_6).2\,H_2O$), sodium fluorophosphate ($Na_2PO_3F$) and sodium polytungstate (3 $Na_2WO_4.9WO_3.H_2O$).

The chemoreactive barium pigments produced by the process may be subjected to an aftertreatment suitable for the particular application envisaged.

If acidic or esterifiable hydroxyl groups, such as

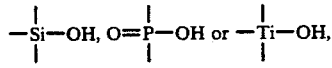

are applied to the barium sulfate surface, for example by the doping components, or if, in addition to the $(SO_4)^{2-}$ anions, other chemically reactable groups, such as $S^{2-}$, $SH^-$ or $F^-$, introduced by co-precipitation are present in the crystallite surface, the $BaSO_4$ pigment may be aftertreated with suitable coupling agents for the particular application. Organofunctional alkoxysilanes, such as vinyl trimethoxysilane, are generally used as coupling agents. However, alkoxy titanates, zirconates or aluminates are also used. The coupling agent is applied by methods known per se. It may be applied to the pigment in solution in a solvent, the solvent being removed and the solid dried. Alternatively, the coupling agent, where it is a liquid, may be applied by spraying to the pigment powder in a moving mixed bed.

The ultrafine barium sulfate to be added as component (C2) to the thermoplastic molding compound is prepared by combining separate aqueous solutions respectively containing equivalent quantities of barium and sulfate ions and separating the precipitate; to produce precipitated barium sulfate having a primary particle size of $<1\,\mu m$ in a closed reactor, the aqueous solutions of the reactants are continuously divided up into large numbers of partial volumes which are combined to form discrete precipitation volumes having an average volume size of $<1\,\mu l$ and the resulting suspension of the precipitate is continuously removed from the reactor. The aqueous solution of the sulfate ion may also contain another anion of a water-soluble inorganic or organic compound which forms sparingly soluble barium compounds (cf. DE-OS 3 703 377 and German patent application P 3 810 423.7).

In the process, therefore, small partial volumes of the reaction solutions are combined in large numbers, for example more than $10^6$ per second, and precipitation is brought about quickly and completely in a reaction volume having an average volume size of $<1\,\mu l$.

To carry out the process, the respective aqueous solutions of the reactants are brought together continuously and rapidly in the form of droplets having an average size of $<0.5\,\mu l$ and combined in a precipitation volume having an average volume size of $<1\,\mu l$.

In another embodiment of the process, the aqueous solution of one reactant is continuously converted into droplets ($<0.5\,\mu l$ in size) and the droplets thus formed are continuously introduced into a flowing film of the aqueous solution of the other reactant.

In other words, droplets of the aqueous solution of one reactant are combined at high speed with droplets of the other reactant or droplets of the aqueous solution of one reactant are projected at high speed into a flowing film of the aqueous solution of the other reactant, for example the droplets of an aqueous barium chloride solution are projected into a flowing film of an aqueous sodium sulfate solution.

The process is best carried out in a closed vertical, cylindrical reactor. The head of the reactor is equipped in known manner with means or devices for dividing aqueous component solutions into very fine droplets and with means for producing a flowing film of aqueous component solutions. At its base, the reactor is best conical in shape and provided with means for removing the reaction mixture or the precipitate suspension.

The reaction solution may be converted into droplets in the head part of the cylindrical reactor by atomization of the solution under pressure, for example through nozzles, or by the application of centrifugal force to the solution, for example using spray disks. The droplets are $<0.5\,\mu l$ and preferably from 0.001 to 0.25 $\mu l$ in size. The flowing film on the inner wall of the reactor is produced in a thickness of 1 to 10 mm.

The droplet streams of the aqueous solutions may be directed diametrically or at an angle to one another. In addition, however, the droplet streams may also be moved parallel to one another in the same direction through the reactor and made to penetrate into, and precipitate, one another.

The film of the precipitate suspension flowing down the wall of the reactor is collected in the lower part of the reactor, discharged from the reactor by a metering unit and worked up into the solid, such as ultrafine barium sulfate having a primary particle size below 0.1 $\mu$ and preferably from 0.09 to 0.01 $\mu$ [BET surface: 80 to 5 $m^2/g$, preferably 40 to 10 $m^2/g$].

The barium sulfate with the chemoreactive surface and/or the ultrafine barium sulfate may be added to and mixed with the other components of the molding compound by standard methods. However, the barium sulfate is preferably added to component (B). For example, the barium sulfate may be added to the polyethylene terephthalate in the form of a suspension in the corresponding diol before the beginning of the polyester-forming reaction. However, the barium sulfate may also be introduced into the melt compounding process in the form of a highly concentrated compound.

The elastomers (D) include copolymers, particularly copolymers, having rubber-elastic properties which may be essentially obtained from at least two of the following monomers: chloroprene, butadiene, isoprene, isobutene, styrene, acrylonitrile, ethylene, propylene, vinyl acetate, (meth)acrylates containing 1 to 18 carbon atoms in the alcohol component and carbon monoxide, i.e. polymers of the type described, for example, in "Methoden der organischen Chemie", (Houben-Weyl), Vol. 14/1, Georg Thieme-Verlag, Stuttgart 1961, pages 393–406, and in C. B. Bucknall, "Toughened Plastics", Appl. Science Publishers, London 1977. Preferred elastomers of component (D) have a gel content of more than 20% by weight, preferably more than 40% by weight and, in particular, more than 60% by weight.

Preferred elastomers D) are ethylene/vinyl acetate copolymers containing 15 to 70% by weight vinyl acetate and having melt indices from non-flowable to 1,000 and preferably from 0.1 to 20, as measured at 190° C. under a load of 2.16 kp in accordance with DIN 53 755. Terpolymers of ethylene, alkyl acrylate or vinyl acetate and carbon monoxide are also preferred.

Other preferred elastomers (D) are the so-called EPM and EPDM rubbers in which the ratio by weight of ethylene to propylene groups is from 40:60 to 90:10 and preferably from 40:60 to 65:35. EP(D)M rubbers containing grafted-on reactive groups (for example MSA) are particularly preferred.

The Mooney viscosities ($ML_{1+4}100°$ C. according to DIN 53 523) of the uncrosslinked EPM and EPDM rubbers are between 25 and 100 and preferably between 35 and 95. The gel contents of the uncrosslinked EPM and EPDM rubbers are below 1% by weight.

The ethylene/propylene copolymers (EPM) used have hardly any double bonds while the ethylene/propylene/diene terpolymers (EPDM) used may contain from 1 to 20 double bonds per 1,000 carbon atoms. Suitable diene monomers in EPDM are, for example, conjugated dienes, for example isoprene and butadiene, unconjugated dienes containing 5 to 25 carbon atoms, for example 1,4-pentadiene, 1,4-hexadiene, 1,5-hexadiene, 2,5-dimethyl-1,5-hexadiene and 1,4-octadiene, cyclic dienes, for example cyclopentadiene, cyclohexadiene, cyclooctadiene and dicyclopentadiene, alkenyl norbornenes, for example 5-ethylidene-2-norbornene, 5-butylidene-2-norbornene, 2-methallyl-5-norbornene, 2-isopropenyl-5-norbornene, and tricyclodienes, for example 3-methyl tricyclo-(5,2,1,0,2,6)3,8-decadiene. The unconjugated dienes 1,5-hexadiene, ethylidene norbornene and dicyclopentadiene are preferred. The diene content in the EPDM is preferably from 0.5 to 10% by weight. EPM and EPDM rubbers of the type in question are described, for example, in DE-OS 2 808 709.

Other preferred elastomers (D) are optionally selectively hydrogenated block copolymers of an aromatic vinyl monomer (X) and a conjugated diene (Y) of the X-Y type. These block copolymers may be produced by known methods. In general, the technique used for the production of styrene-diene block copolymers which is described in "Encyclopedia of Polymer Science and Technology", Vol. 15, Interscience, N.Y. (1971), pages 508 et seq, may be used for the production of the suitable X-Y block copolymers from, for example, styrene, α-methyl styrene and/or vinyl toluene and from conjugated dienes, such as butadiene and/or isoprene. The selective hydrogenation may be carried out by methods known per se and means that the ethylenic double bonds are substantially completely hydrogenated, the aromatic double bonds remaining largely unaffected.

Other preferred elastomers (D) are, for example, polybutadienes, butadiene/styrene copolymers and acrylate rubbers grafted with styrene and/or acrylonitrile and/or (meth)acrylates; i.e. copolymers of the type described in DE-OS 1 694 173; polybutadienes, butadiene/styrene or butadiene/acrylonitrile copolymers, polyisobutenes or polyisoprenes grafted with acrylates or methacrylates, vinyl acetate, acrylonitrile, styrene and/or alkyl styrenes, of the type described for example in DE-OS 2 348 377.

Particularly preferred elastomers D) are graft polymers obtained by grafting of

I. 10 to 40, preferably 10 to 35 and more preferably 15 to 25% by weight, based on graft product, of at least one (meth)acrylate and/or a mixture of 10 to 35 and preferably 20 to 35% by weight, based on mixture, of acrylonitrile and 65 to 90 and preferably 65 to 80% by weight, based on mixture, of styrene on II. 60 to 90, preferably 65 to 90 and more preferably 75 to 85% by weight, based on graft product, of a butadiene polymer containing at least 70% by weight, based on II, butadiene residues as the graft base, the gel content of the graft base II being at least 70% by weight (as measured in toluene), the degree of grafting G being from 0.15 to 0.55 and the average particle diameter $d_{50}$ of the graft polymer being from 0.2 to 0.6 and preferably from 0.3 to 0.5 μm.

(Meth)acrylates I are esters of acrylic or methacrylic acid and monohydric alcohols containing 1 to 8 carbon atoms, for example methyl, ethyl and propyl methacrylate.

In addition to butadiene residues, the graft base II may contain up to 30% by weight, based on II, of residues of other ethylenically unsaturated monomers, such as styrene, acrylonitrile, esters of acrylic or methacrylic acid containing 1 to 4 carbon atoms in the alcohol component (such as methyl acrylate, ethyl acrylate, methyl methacrylate, ethyl methacrylate). The preferred graft base II consists of pure polybutadiene.

Since the graft monomers I are normally not completely grafted onto the graft base II in the grafting reaction, graft polymers in the context of the invention are also understood to include products which, besides the actual graft polymers, also contain homopolymers and copolymers of the graft monomers I used.

The average particle diameter $d_{50}$ is the diameter above which 50% by weight and below which 50% by weight of the particles lie. It may be determined by ultracentrifuge measurements (W. Scholtan, H. Lange, Kolloid. Z. und Z. Polymere 250 (1972), 782–796) or by electron microscopy and subsequent counting of the particles (G. Kämpf, H. Schuster, Angew. Makromolekulare Chemie 14, (1970), 111–129) or by light scattering measurements.

The degree of grafting G is the ratio by weight of grafted-on graft monomers to the graft base and is dimensionless.

Graft polymers of the type in question are described, for example, in DE 3 324 398.

Other particularly preferred elastomers (D) are graft polymers of (a) 25 to 98% by weight, based on component (D), of acrylate rubber having a glass transition temperature below −20° C. as the graft base and (b) 2 to 75% by weight, based on component (D), of at least one polymerizable, ethylenically unsaturated monomer of which the homo- or copolymer(s) formed in the absence of (a) would have a glass transition temperature above 25° C. as the graft monomers.

The acrylate rubbers (a) of the above-mentioned polymers (D) are preferably polymers of alkyl acrylates, optionally with up to 40% by weight, based on (a), of other polymerizable, ethylenically unsaturated monomers. If the acrylate rubbers used as graft base (a) are themselves graft products having a diene rubber core, as described below, the diene rubber core is not included in the calculation of these percentages. Preferred polymerizable acrylates include $C_{1-8}$ alkyl acrylates, for example methyl, ethyl, butyl, octyl and 2-ethyl hexyl acrylate, haloalkyl acrylates, preferably halo-$C_{1-8}$-alkyl acrylates, such as chloroethyl acrylate, and aromatic acrylates, such as benzyl acrylate and phenethyl acrylate. They may be used individually or in admixture.

The acrylate rubbers (a) may be uncrosslinked or crosslinked and are preferably partly crosslinked.

Monomers containing more than one polymerizable double bond may be copolymerized for crosslinking. Preferred examples of crosslinking monomers are esters of unsaturated monocarboxylic acids containing 3 to 8 C atoms and unsaturated monohydric alcohols containing 3 to 12 C atoms or saturated polyols containing 2 to 4 OH groups and 2 to 20 C atoms, such as ethylene glycol dimethacrylate, allyl methacrylate; polyunsaturated heterocyclic compounds, such as trivinyl and triallyl cyanurate and isocyanurate, triacryloyl-s-triazines, particularly triallyl cyanurate; polyfunctional vinyl compounds, such as di- and trivinylbenzene, and also triallyl phosphate and diallyl phthalate.

Preferred crosslinking monomers are allyl methacrylate, ethylene glycol dimethacrylate, diallyl phthalate and heterocyclic compounds containing at least three ethylenically unsaturated groups.

Particularly preferred crosslinking monomers are the cyclic monomers triallyl cyanurate, triallyl isocyanurate, trivinyl cyanurate, triacryloyl hexahydro-s-triazine and triallylbenzenes.

The crosslinking monomers are preferably used in a quantity of 0.02 to 5% by weight and more preferably in a quantity of 0.05 to 2% by weight, based on graft base (a).

In the case of cyclic crosslinking monomers containing at least three ethylenically unsaturated groups, it is of advantage to limit the quantity to 1% by weight of the graft base (a).

Preferred "other" polymerizable, ethylenically unsaturated monomers which may optionally be used in addition to the acrylates for the production of the graft base (a) are, for example, acrylonitrile, styrene, α-methyl styrene, acrylamides, vinyl-$C_{1-6}$ alkyl ethers, butadiene, isoprene. Preferred acrylate rubbers as the graft base (a) are emulsion polymers which have a gel content of 60% by weight.

The gel content of the graft base (a) is determined at 25° C. in dimethyl formamide (M. Hoffmann, H. Krömer, R. Kuhn, Polymeranalytik I und II, Georg-Thieme-Verlag Stuttgart, 1977).

Acrylate rubbers as the graft base (a) may also be products which contain a crosslinked diene rubber of one or more conjugated dienes, such as polybutadiene, or a copolymer of a conjugated diene with an ethylenically unsaturated monomer, such as styrene and/or acrylonitrile, as core.

The percentage content of the polydiene core in the graft base (a) may be from 0.1 to 80% by weight and preferably from 10 to 50% by weight, based on (a). The shell and the core may be uncrosslinked, partly crosslinked or highly crosslinked independently of one another.

Particularly preferred graft bases (a) for graft polymers (D) based on polyacrylates are summarized in the following:

1. acrylate polymers and copolymers without a diene rubber core and
2. acrylate polymers and copolymers containing a diene rubber core.

The graft yield, i.e. the quotient of the quantity of monomer (b) grafted on and the quantity of graft monomer (b) used is generally from 20 to 80% by weight and may be determined in accordance with M. Hoffmann, H. Krömer, R. Kuhn, Polymeranalytik, Vol. 1, Georg-Thieme-Verlag, Stuttgart 1977.

Preferred graft monomers (b) are α-methyl styrene, styrene, acrylonitrile, methyl methacrylate or mixtures of these monomers. Preferred graft monomer mixtures are those of styrene and acrylonitrile in a ratio by weight of 90:10 to 50:50.

Graft polymers (D) based on polyacrylates are described, for example, in DE-AS 2 444 584 (=U.S. Pat. No. 4,022,748) and in DE-OS 2 726 256 (=U.S. Pat. No. 4,096,202).

Particularly advantageous graft polymers of the type in question are obtained by grafting 2 to 20 and preferably 2 to 15% by weight, based on (D), of monomer (b) onto 80 to 98 and preferably 85 to 97% by weight, based on (D), of the completely broken latex of (a) suspended in water in the absence of suspending agents. The powder-form graft polymer obtained may then be dried and homogenized in the desired ratio with the other components under the effect of shear forces in such a way that the average particle size $d_{50}$ of component (D) in the mixture according to the invention is from 0.05 to 3 μm, preferably from 0.1 to 2 μm and more preferably from 0.2 to 1 μm.

The expression "in the absence of suspending agents" means the absence of substances which, depending on type and quantity, could suspend the graft monomers (b) in the aqueous phase. The definition does not exclude the presence of substances which have had a suspending effect, for example, in the production of a grafted graft base (a). In such cases, the coagulant or precipitant used to break the latex (a) must be added in a quantity which compensates the suspending effect of the substances used in the preliminary stage; in other words, it is important to ensure that the graft monomers (b) do not form a (stable) emulsion or dispersion in the aqueous phase.

A graft polymer (D) thus prepared in the absence of suspending agents, as a constituent of the molding compounds according to the invention, may be divided up in the other resin components to particles extremely small in size which withstand even prolonged processing at elevated temperature relatively unchanged.

The expression "particles extremely small in size" means that the number, shape and size of the graft polymer particles to be used still largely correspond to the number, shape and size of the graft polymer particles introduced into the other molten resin components, even after homogenization.

The graft base (a) may also be an acrylate rubber of the type which is formed as an aqueous emulsion (latex) and of which the latex particles contain 1 to 20% by weight and preferably 1 to 10% by weight, based on (a), of monomers already grafted on in aqueous emulsion, of which the homopolymers or copolymers would have glass temperatures of $>0°$ C.

Preferred grafted-on monomers of this type are alkyl acrylates, alkyl methacrylates, styrene, acrylonitrile, α-methyl styrene and/or vinyl acetate.

Graft bases (a) of the type in question are produced, for example, by emulsion polymerization or by emulsion graft polymerization. However, they may also be produced by preparing an acrylate rubber in solution or bulk, grafting on the graft monomers and then converting the rubbers into an aqueous emulsion which is suitable for further grafting processes.

Accordingly, in addition to the polymers listed above, graft polymers produced in aqueous emulsion from acrylate polymers or copolymers optionally containing the diene rubber core and ethylenically unsaturated, polymerizable monomers are also preferred as graft bases (a) for acrylate rubbers of this particular embodiment.

In addition to the elastomers (D) mentioned above, it is also possible to use elastic polyurethanes (for example Texin®), elastic polyester-polyether block copolymers (for example Hytrel®) and elastic polycarbonate-polyether block copolymers. These elastomers are known and are described, for example, in H. G. Elias, Makromolekule, Hüthig u. Wepf Verlag Basel, 4th Edition 1981, page 787, and A Noshay and J. E. McGrath, Block Copolymers, Academic Press, New York, 1977, page 341.

Other suitable elastomers are silicone graft rubbers of the type described, for example, in DE 3 629 763.

The molding compounds according to the invention based on components (A), (B), (C) and, optionally, (D) may be produced in standard mixing units, such as mixing rolls, kneaders, single-screw and multiple-screw extruders. Although in most cases components (A), (B), (C) and, optionally, (D) are best mixed in a single step, it may even be advisable in some cases initially to omit one component and to add it at a later stage.

The molding compounds according to the invention based on components (A), (B), (C) and, optionally, (D) may contain the usual additives, such as lubricants and mold release agents, nucleating agents, stabilizers, fillers and reinforcing materials, flameproofing agents and also dyes.

These additives may either be added in the usual quantities to, and mixed with, components (A) and/or (B) before the preparation of the mixtures according to the invention or may be subsequently incorporated in the mixtures according to the invention. The quantity in which the additives are used is gauged in such a way that the additives are able to develop the desired effect in the mixture. This quantity may readily be determined by preliminary tests.

The molding compounds according to the invention may be used for the production of moldings, semi-finished goods, fibers and films. The moldings produced therefrom are used, for example, in the automotive field.

EXAMPLES

Preparation of components (C1) and (C2)

Example I (a) To prepare a barium sulfate having a chemoreactive surface (component C1)), a barium chloride solution was reacted with stirring with a sodium sulfate solution in a precipitation cell. Before the reaction, the $Na_2SO_4$ solution (density 1.088 g/ml) was alkalized with 7 g sodium hydroxide per liter $Na_2SiO_4$ solution, followed by the addition of 32 g $Na_2SiO_3$ solution (density 1.346 g/ml) per liter sulfate solution. 105.7 ml/min $BaCl_2$ solution (density 1.073 g/ml) and 896 ml/min of the silicate-containing $Na_2SO_4$ solution were passed through the apparatus. The precipitate was filtered off, washed repeatedly with water and dried at 110° C. Wet-chemical analysis of the dry product revealed an $SiO_2$ content of 0.62%. The BET surface of the product was 18.3 m$^2$/g.

(b) To modify the surface of a silicate-containing barium sulfate prepared in accordance with (a) with a vinyl group, the barium sulfate was dispersed in anhydrous isopropanol (solids content 10% by weight). A 1% solution of vinyl trimethoxysilane in anhydrous isopropanol was added dropwise with stirring in such a quantity that the suspension contained 0.5% by weight of the silane, based on the pigment. The dispersion was stirred for about 1 hour at about 40° C. and then filtered. The unused physisorptively bound silane was then washed out of the solid with anhydrous propanol and the solid subsequently dried. A $BaSO_4$ on which the vinyl group could be detected by IR spectroscopy was obtained.

Example II

To precipitate an ultrafine barium sulfate (component C2) from aqueous solutions of barium chloride and sodium sulfate by means of an atomizing unit, sodium sulfate solution (density 1.033 g/ml) was pumped through an annular nozzle into a closed, vertical, cylindrical reactor (diameter 300 mm) in such a way that a flowing, thin falling film was formed on the inner wall of the reactor. The barium chloride solution (density 1.162 g/ml) was introduced beneath the annular nozzle through a concentrically arranged centrifugal spray disk with radial passages rotating at 40,000 r.p.m.. A precipitation volume of less than 0.001 cm$^3$ was obtained through the droplets in this flowing film. The barium sulfate suspension formed was collected at the lower end of the tube, freed from the mother liquor, washed and dried at 110° C. For a molar ratio of sodium sulfate to barium chloride of 1:0.7 and for throughputs of 0.83 mol/min barium chloride and 1.19 mol/min sodium sulfate, an ultrafine barium sulfate having a particle size of 0.07 μm was obtained The powder had a specific BET surface of 33 m$^2$/g.

Example III

The precipitation of an ultrafine barium sulfate (component C1) and 2)) from an aqueous solution of sodium sulfate and an aqueous sodium sulfate solution containing sodium lauryl sulfate was carried out in an atomizing unit. To this end, two spray nozzles were arranged in a closed, cylindrical vertical reactor in such a way that their outlet orifices were opposite one another at a distance of 500 mm and the spray cones formed a congruent circle in the vertical contact surface. An aqueous barium chloride solution (density 1.050 g/ml) was sprayed through one nozzle under an air pressure of 6 bar while, at the same time, a sodium sulfate solution containing 2.5 g sodium lauryl sulfate per liter Na$_2$SO$_4$ solution (density 1.104 g/ml) and a pressure of 3.2 bar was sprayed through the other nozzle.

The throughputs of the sodium sulfate solution containing sodium lauryl sulfate and the barium chloride solution were respectively 44.2 l/h and 81.8 l/h. The barium sulfate suspension formed was collected, freed from the mother liquor, washed repeatedly with water to a conductivity of the suspension of 100 μS/cm and then dried at 110° C. Carbon determination of the dry product revealed a carbon content of 0.32%. The powder had a specific BET surface of 36 m$^2$/g, corresponding to a primary particle size of 0.038 μm.

Example IV

To prepare an ultrafine, low-salt barium sulfate (component C2)), precipitation was carried out in an atomizing unit by reaction of a barium hydroxide solution with sulfuric acid.

Barium hydroxide solution (density 1.060 g/ml at 75° C.) and sulfuric acid (density 1.060 g/ml at 25° C.) were atomized under a pressure of 3.3 bar in a three-component spray nozzle fixed centrally to the cover of a closed, vertical, cylindrical reactor. The two reactants impinged on one another in a circular full cone at the nozzle orifice. The throughputs of the Ba(OH)$_2$ solution and the sulfuric acid were respectively 12.6 l/h and 12.3 l. The BaSO$_4$ suspension formed was collected, adjusted to pH 6.5 to 7.0, the precipitated product was separated off and then dried at 110° to 120° C.

The dry product had a specific BET surface of 51.5 m$^2$/g, corresponding to a primary particle size of 0.026 μm.

Substances used (components)
(A) See Table
(B) The polyethylene terephthalates used had the following intrinsic viscosities, as measured in o-dichlorobenzene/phenol (1:1) at 25° C.:
I. 0.725 dl/g
II: 0.637 dl/g
III: 0.905 dl/g
The polyethylene terephthalate II, in contrast to I and III, contains 3% by weight barium sulfate (type C1)).
(D) See Table 80×10×4 mm test specimens were made from the molding compounds in a standard injection molding machine. They were tested for softening point (Vicat B) (DIN 53 460) and for Izod notched impact strength (ISO 180) at various temperatures, the tough/brittle transition being determined from the results obtained.

TABLE 1

| Example | 1 (Comparison) | 2 | 3 (Comparison) | 4 | 5 (Comparison) | 6 |
|---|---|---|---|---|---|---|
| Components (% by weight) | | | | | | |
| PET type | I | II | I | II | III | II |
| PET | 22 | 22 | 24 | 24 | 22 | 22 |
| PC | 70[1] | 70[1] | 76[1] | 76[1] | 56[2] | 56[2] |
| Graft polymer | 8[3] | 8[3] | — | — | 22[4] | 22[4] |
| $a_k$ (kJ/m$^2$, RT) | 67* | 74.6* | 10.5 | 14.3 | 64* | 65* |
| $T_k^5$ (°C.) | −20 | −20/30 | — | — | <−40 | <−40 |
| Vicat B (°C.) | 138 | 142 | 142.5 | 147.5 | 120 | 129 |

*Tough fracture
[1]Homopolymer of 2,2-bis-(4-hydroxyphenyl)-propane ($\eta_{rel}$ = 1.29, as measured in dichloromethane at 25° C. and at a concentration of 0.5 g/ml)
[2]Homopolymer of 2,2-bis-(4-hydroxyphenyl)-propane ($\eta_{rel}$ = 1.26, as measured in dichloromethane at 25° C. and at a concentration of 0.5 g/ml)
[3]Acrylate polymer obtained by emulsion graft polymerization of 20 parts by weight methyl methacrylate/n-butyl acrylate mixture (ratio by weight 18:2) onto 80 parts by weight particulate polybutadiene rubber latex (d$_{50}$ = 0.4 μm)
[4]SAN graft polymer obtained by emulsion graft polymerization of 50 parts by weight styrene-acrylonitrile mixture (ratio by weight 72:28) onto 50 parts by weight particulate polybutadiene rubber latex (d$_{50}$ = 0.1 μm)
[5]Tough/brittle transition temperature

What is claimed is:

1. Thermoplastic molding compositions of
   (A) 1 to 99 parts by weight polycarbonate,
   (B) 1 to 99 parts by weight polyalkylene terephthalate,
   (C1) 0.1 to 50 parts by weight barium sulfate having a chemoreactive surface produced by precipitation of barium ions with sulfate ions in aqueous medium in the presence of additional anions of water soluble compounds which can be precipitated with barium ions and form sparingly soluble barium compounds, the chemoreactive barium sulfate obtained, optionally aftertreated with coupling agents, having particle sizes of >0.1 μm [80 to 5 m$^2$/g (BET)], and/or
   (C2) 0.1 to 50 parts by weight ultrafine barium sulfate produced by combining separate aqueous solutions respectively containing equivalent quantities of barium ions and sulfate ions and separating the precipitate; to produce precipitated barium sulfate having a primary particle size of <0.1 μm in a closed reactor, the aqueous solutions of the reactants are continuously divided up into large numbers of partial volumes which are combined to form discrete precipitation volumes having an average volume size of <1 μl and the resulting suspension of the precipitate is continuously removed from the reactor,
   and, optionally,
   (D) 0.1 to 30 parts by weight of an elastomer with the proviso that components (A) to (C) or (D) add up to 100 parts by weight.

2. Thermoplastic molding composition as claimed in claim 1, characterized in that it contain 20 to 80 parts by weight of component (A), 80 to 10 parts by weight of component (B), 0.1 to 40 parts by weight of component (C1) and/or (C2) and, optionally, 1 to 30 parts by weight of component (D).

3. Thermoplastic molding compositions as claimed in claim 1, characterized in that it contains 40 to 70 parts by weight of component (A), 20 to 60 parts by weight of component (B), 0.1 to 5 parts by weight of component (C1) and/or (C2) and, optionally, 5 to 25 parts by weight of component (D).

4. A molded article comprising the thermoplastic molding composition of claim 1.

* * * * *